Aug. 11, 1970 J. H. DRINKARD ET AL 3,523,353

BACK PLANE WIRING APPARATUS

Filed April 26, 1968 6 Sheets-Sheet 1

INVENTORS.
JOHN H. DRINKARD
EDWARD D. GIANDOMENICO
HAROLD GRENZ

Carl Fissell Jr.
AGENT

BACK PLANE WIRING APPARATUS

Filed April 26, 1968

INVENTORS.
JOHN H. DRINKARD
EDWARD D. GIANDOMENICO
HAROLD GRENZ

AGENT

BACK PLANE WIRING APPARATUS

Filed April 26, 1968 6 Sheets-Sheet 3

INVENTORS.
JOHN H. DRINKARD
EDWARD D. GIANDOMENICO
HAROLD GRENZ
Carl Fissell Jr.
AGENT

BACK PLANE WIRING APPARATUS

Filed April 26, 1968 6 Sheets-Sheet 4

INVENTORS.
JOHN H. DRINKARD
EDWARD D. GIANDOMENICO
HAROLD GRENZ

Carl Fissell Jr.
AGENT

INVENTORS.
JOHN H. DRINKARD
EDWARD D. GIANDOMENICO
HAROLD GRENZ
Carl Fissell Jr.
AGENT INVENTORS.
JOHN H. DRINKARD
EDWARD D. GIANDOMENICO
HAROLD GRENZ
Carl Fissell Jr.
AGENT United States Patent Office 3,523,353
Patented Aug. 11, 1970

3,523,353

BACK PLANE WIRING APPARATUS

John H. Drinkard, Exton, Edward D. Giandomenico, Broomall, and Harold Grenz, Lionville, Pa., assignors to Burroughs Corporation, Detroit, Mich., a corporation of Michigan Filed Apr. 26, 1968, Ser. No. 724,563
Int. Cl. H05k *13/04, 13/06;* B23d *19/04*
U.S. Cl. 29—203 10 Claims

ABSTRACT OF THE DISCLOSURE

This invention provides semi-automatic means and apparatus for electrically interconnecting electrically conductive contacts of a back plane wiring array wherein a stylus member carried by an orthogonally movable planograph assembly is indexable along two different axes at right angles to one another with reference to a stylus locating member. Multiple means operatively associated with the planograph assembly enable electrical connection devices demountably carried thereby to be simultaneously and concurrently indexed over the conductive connectors of associated back plane wiring panels. Means is provided on the planograph assembly for the selective and adaptive application of multiple spaced wiring connections on each individual electrical connector of the back plane wiring panel. The planograph assembly also includes means insuring the accurate positioning of the electrical connecting device adjacent an individual electrical connector while avoiding accidental contact with and/or damage to other adjacent connectors.

BACKGROUND OF THE INVENTION

Field of the invention

The present invention is useful and generally may be employed in the fabrication of electronic data processing subassemblies such, for example, as the interstage amplifier circuit cards, shift register cards, gating circuit cards, etc., which are adapted to be pluggably, demountably insertable and removable relative to local wiring frames of an electronic data processor.

Description of the prior art

Back plane wiring of large scale multicontact back planes has not been completely automated to the present time because of a number of limitations which are imposed on the structural arrangement and configuration of such back planes. It is difficult to organize the wiring in a manner lending itself completely to automatic programming. Furthermore, unless the wiring layout is standardized, each such wiring layout necessitates a separate, individual program. There are available automatically programmed machines which, while settable for many specific back planes, include certain limitations preventing the universal application of such machines. No known machine on the market as of the present time is capable of terminating two conductors at the opposite ends of a twisted pair of conductors. Additionally, this apparatus is relatively expensive, and while generally reliable, when break downs do occur or errors are discovered in the wiring layout, the solution of such errors oftentimes requires that an entire wiring layout or portion thereof be completely disassembled or removed from the back plane.

The present invention reduces the errors as a practical value to zero while at the same time increasing the speed with which the electrical terminations can be accomplished. This invention enables the interconnection of "twisted pairs," i.e., terminating the opposite ends of two single conductors twisted together forming two wires at each end of the pair.

BRIEF SUMMARY OF THE INVENTION

The present invention provides a multiple station wire wrap locating and attaching planograph assembly. A centrally located or disposed stylus operator mechanically indexes a stylus carrying jig plate in orthogonal directions at will in accordance with a pre-arranged wiring layout, e.g., punch card or Mylar plastic overlay bearing the origination and termination designations providing a two coordinate location map of desired electrical connections on the back plane. Three work station locating arms carried by the jig plate permit the work station operators to physically locate the wire terminating device, e.g., wire wrap gun, precisely and exactly without error over the electrically conductive connecting pin of the back plane wiring assembly designated by the stylus operator from the wiring layout. Each of the three stations of the planograph fixture are provided with wire wrap level control means providing automatic level control for the number of turns of wire which the terminating device will apply to each of the back plane terminals with which it is operably associated. A wire guard carried by each of the station locating devices prevents the terminating device from being accidentally engaged with other than the desired terminal pin.

It is an important object of the present invention, therefore, to provide a wire wrap locating assembly enabling one or more unnskilled operators to electrically interconnect individual terminal conductors of a back plane wiring panel without the necessity for identifying or locating the terminals.

It is another object of the invention to provide a relatively high speed multistation wire wrap locating fixture for accurately and precisely applying multiple levels of electrical wiring to the electric contacts of a back plane wiring assembly.

A still further object of the invention is to provide a wire wrap locating and attaching fixture which can be employed with various sizes of back plane wiring panels and with varying lengths of electrical terminals associated therewith.

Another object of the invention is to provide wire wrap locating and connecting apparatus capable of securing opposite ends of twisted pairs of conductors to associated electrical terminals.

DETAILED DESCRIPTION OF THE INVENTION

Figure 1:
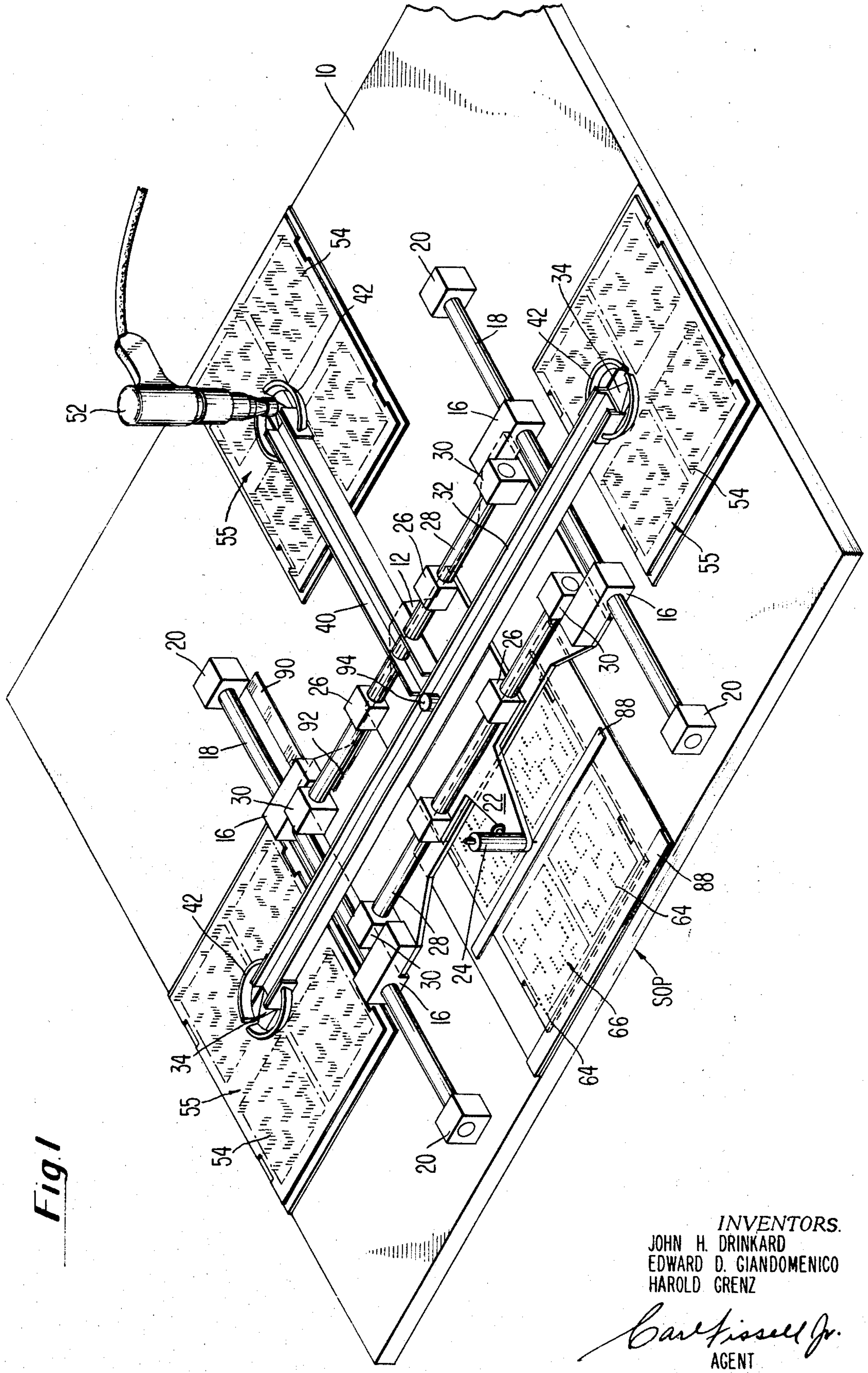
FIG. 1 is an isometric illustration on a reduced scale of the planograph wire wrap assembly of the invention.
Figure 2:
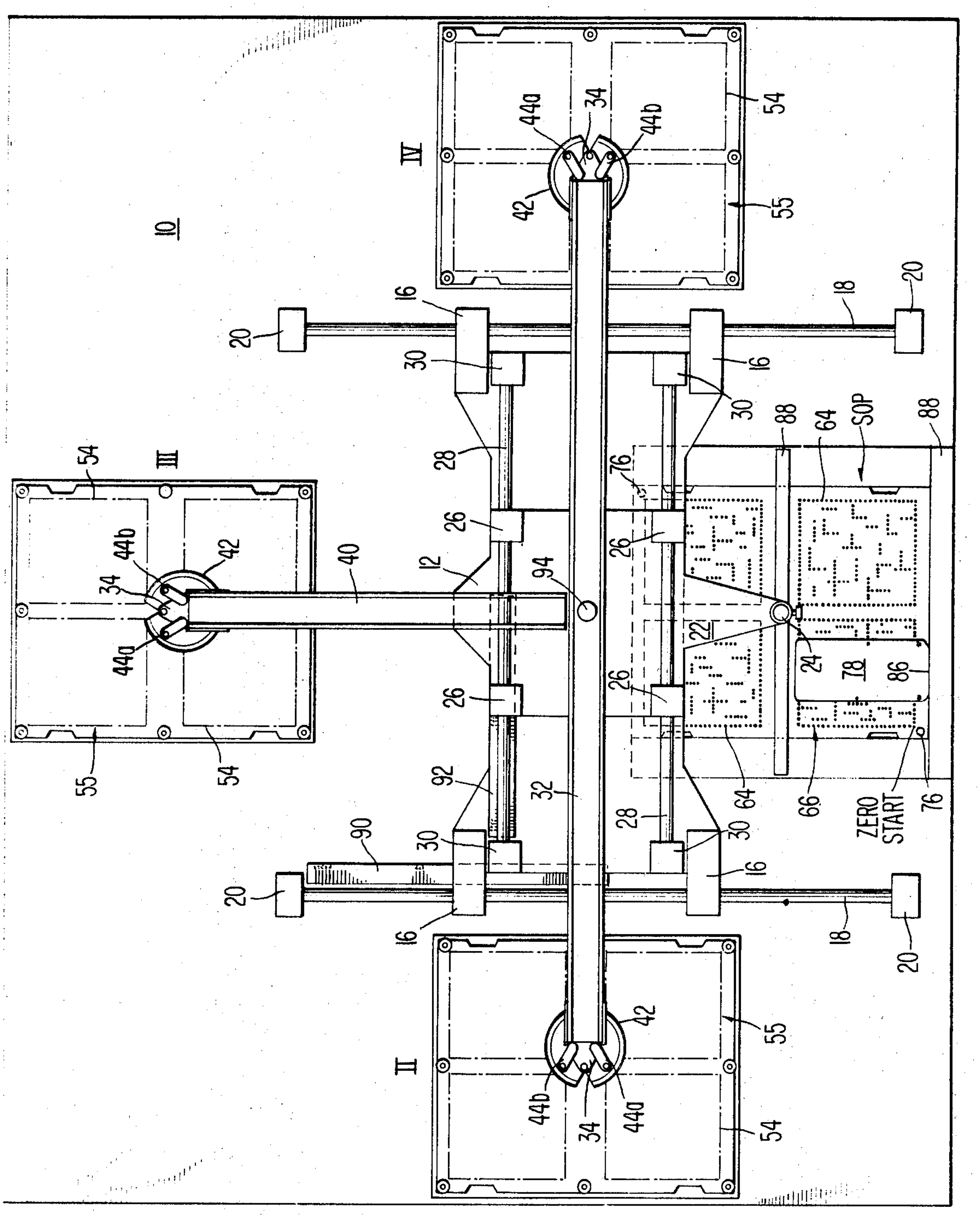
FIG. 2 is a top plan view of the apparatus of FIG. 1.

Apparatus embodying the present invention, as seen in FIGS. 1 and 2, is or may be mounted on a rigid bed or plate member 10, such, for example, as aluminum, and includes two movable jig plate members 12 and 14 which are mounted, as hereinafter described, for independent movement in two orthogonal directions. Thus member 12, for example, can move in the horizontal or lateral right-left direction as shown, while member 14 partakes of movement in the fore and aft direction, both movements parallel with the plane of the drawing.

Member 14, which is or may be irregularly shaped to provide visual clearance, among other things, is a generally rectangular, flat, planar member of aluminum, and is provided with pairs of ball bushings, not shown, located at opposite ends thereof in block members 16. Blocks 16 are secured to member 14 permitting the latter to be slidably movable along parallel, circular guide rails 18. Rails 18 are secured at opposite ends in end blocks 20 firmly attached to the base member 10. The member 12, generally square in outline, includes an integral forwardly extending triangularly shaped tongue or projection 22 carrying a demountable stylus member 24. Four quadrantally disposed ball bushings (not shown) carried by blocks 26 secured to member 12 permit the latter to move laterally along parallel guide rails 28, the opposite ends of which are fixed in end blocks 30 attached to the flat planar plate member 14.

Figure 7:
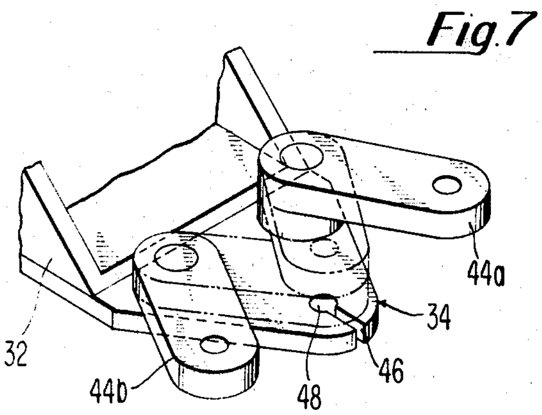
FIG. 7 is an enlarged isometric view of the wire wrap level control of the present invention.

Secured (as, for example, by bolts or welding, not shown) to the upper exposed surface of the member 14 and extending parallel with the long dimension thereof is a horizontally disposed channel member 32 of rigid material, e.g., aluminum. Each opposite end of member 32 is provided with a demountable target hole adaptor member 34. Fore and aft adjustment of the member 34 is provided by means of a slot 36 and pin 38 arrangement as seen in FIG. 7. Tie down nut 39 maintains the adjustment and prevents accidental dislodgement.

Arranged at right angles or normal to channel member 32 is a second shorter channel member 40 otherwise identical in construction to channel member 32 and attached, as is channel member 32, to the movable member 12, as, for example, by bolts and nuts or welding (not shown).

Each of the target hole adaptors 34 is provided with a shallow cup shaped wire guard 42 having an upturned peripheral rim for purposes to be explained hereinafter. Oppositely disposed, arcuately rotatable wire level control ears or flaps **44*a*, 44*b***, FIG. 2, provide automatic level control for the number of turns of wire which the wire wrap gun used with the present fixture will provide on the back plane terminal with which it may be associated, as seen most clearly in FIGS. 3 and 10.

Figure 3:
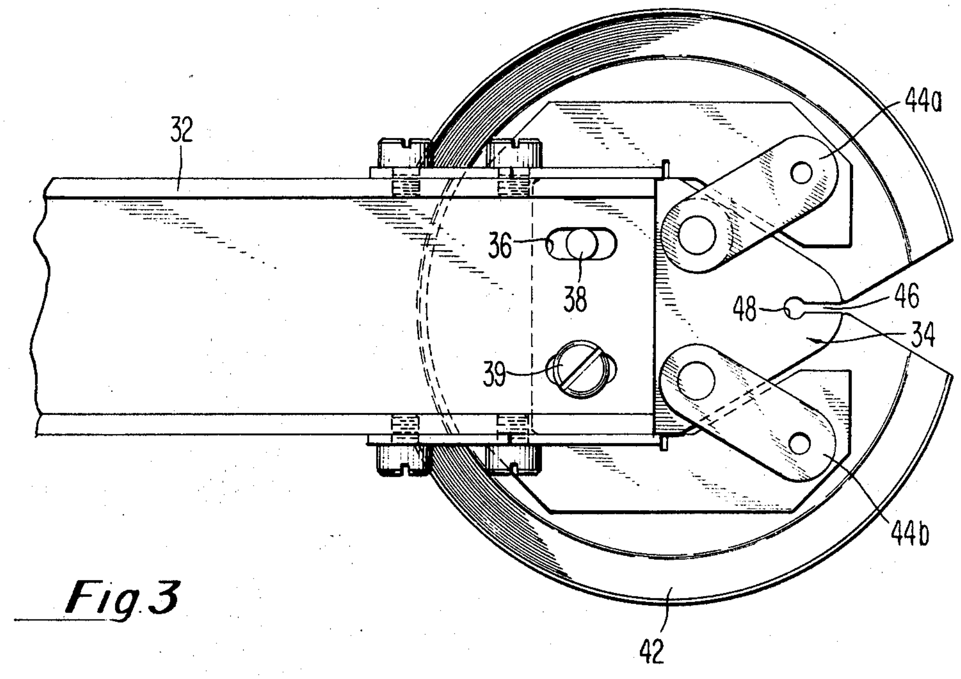
FIG. 3 is a plan view drawn to an enlarged scale of one end of the operators' station of the present invention illustrating the terminal guard and the wire wrap level control.
Figure 4:
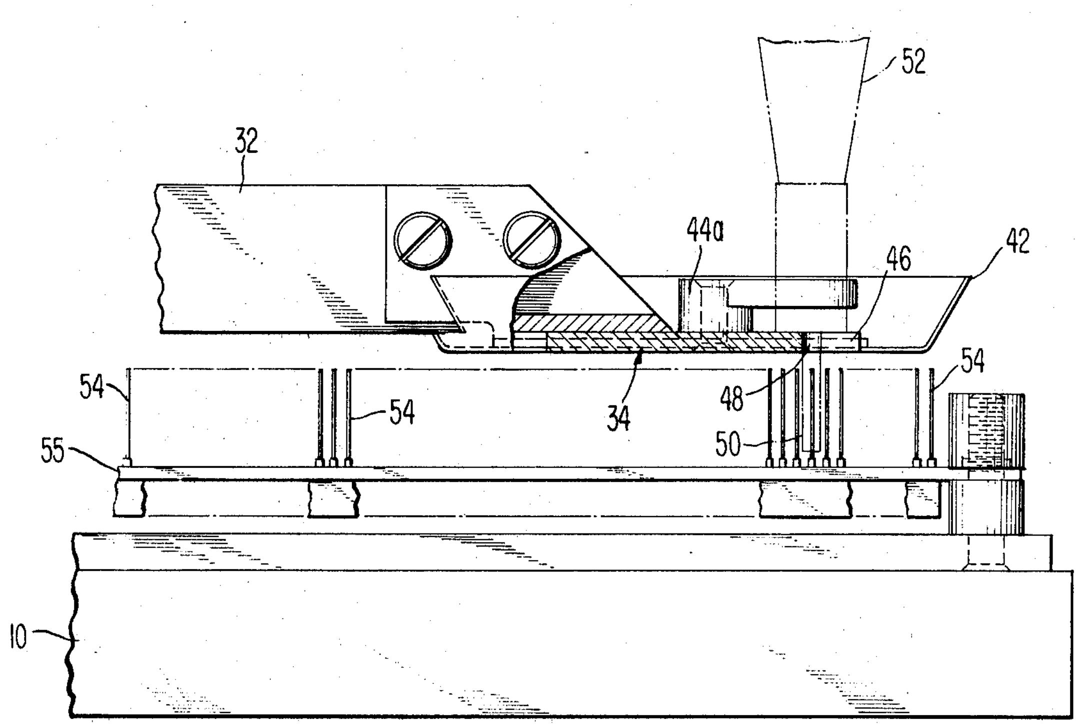
FIG. 4 is a side elevation view of one end of the wire wrap locating fixture partially broken away with the device in operative association with a back plane wiring panel.
Figure 5:
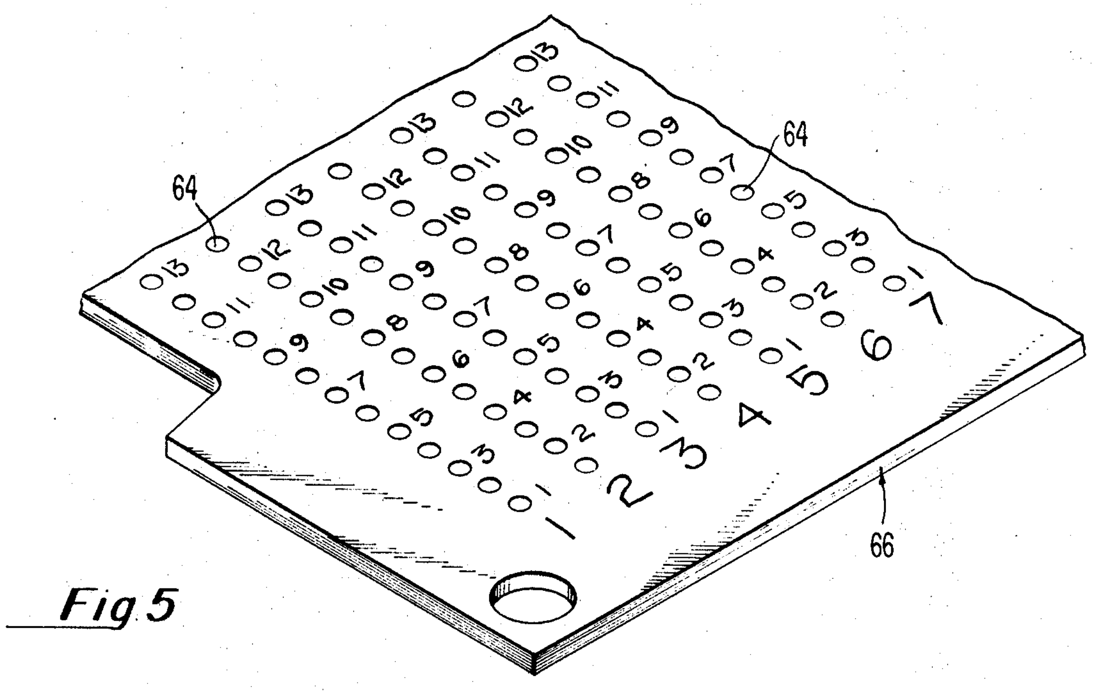
FIG. 5 is an illustration of a portion of the control template for the wire wrap locating fixture drawn to an enlarged scale.
Figure 6:
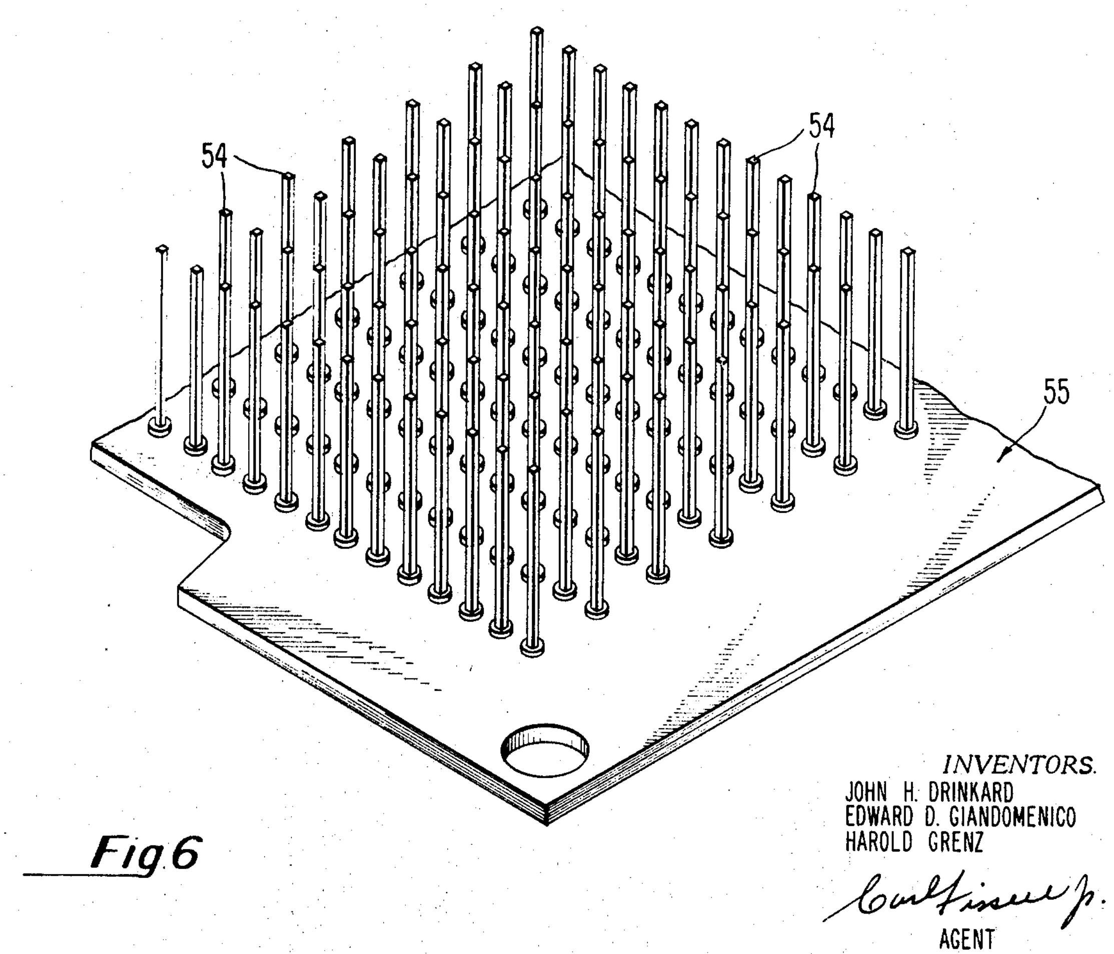
FIG. 6 is an isometric illustration of a portion of a back plane wiring panel drawn to an enlarged scale to show the ordered arrangement of the electrically conductive terminals of a back plane wiring panel used with the present invention.
Figure 10:
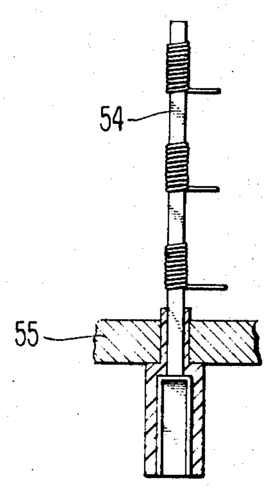
FIG. 10 is an illustration drawn to an exaggerated scale of an electrical terminal of a back plane wiring assembly depicting multiple layers of wire wrapped by means of this invention.
Figure 11:
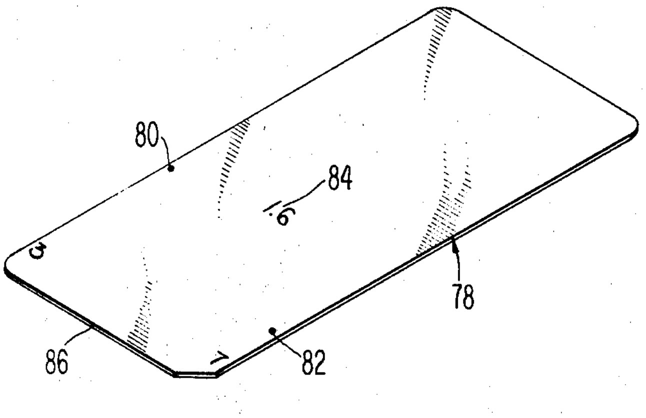
FIG. 11 is an isometric illustration of a control card template for use with the stylus member and assembly of FIG. 5 of the present invention.
Figure 9:
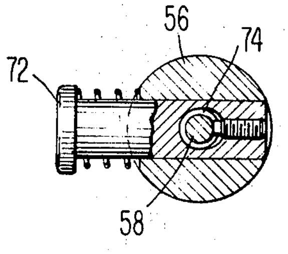
FIG. 9 is a view taken along the line 9—9 of FIG. 8 illustrating the detent mechanism of the stylus member.

The end of each target hole adaptor member 34 is generally triangularly shaped with a slot 46 at the apex, FIGS. 3 and 7. The slot 46 terminates in a circular bore 48 of sufficient diameter to slidably receive the operating end 50 of a wire wrap gun 52, FIGS. 1 and 4, with which it is to be associated. The wrapping mechanism 50 of the gun as seen in FIG. 4 is adapted to surround a terminal 54 of a back plane 55 during the wire wrapping operation. With the wire wrap gun engaged in the bore 48 a single multi-turn layer or wrap of wire may be applied to the terminal. Provision is made with the present invention for from 1 to 3 levels of wire wraps on each back plane terminal. The control ears **44*a* and 44*b*** (which when so desired are capable of overlying each other as in dotted outline in FIG. 7) provide not only for the increased number of levels, but also by virtue of their thickness automatically produce a slight spacing between each level of wrapped wire, as seen in FIG. 10.

Figure 8:
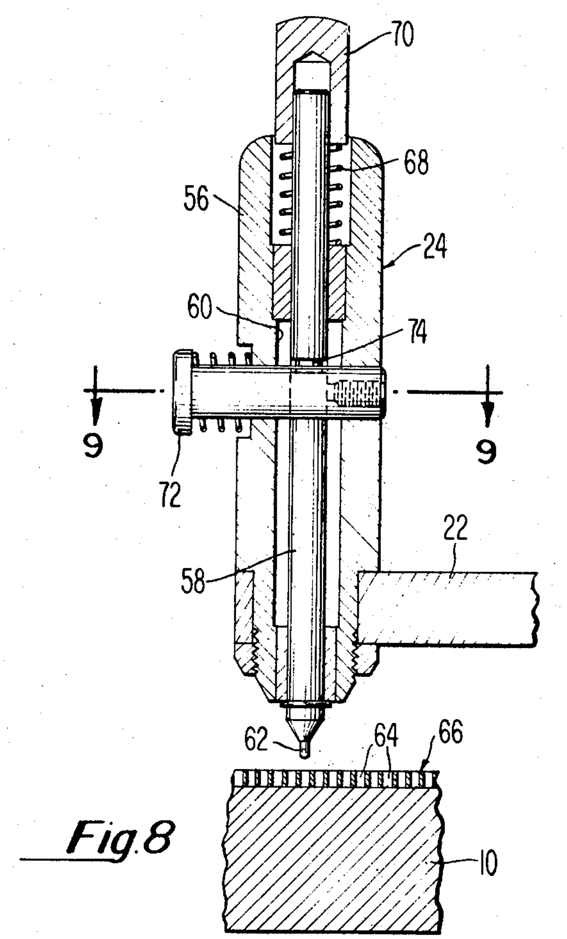
FIG. 8 is a sectional side elevational view of the indexable stylus control member shown in conjunction with a portion of the wire layout template fixture of FIG. 5.

Located on the same center line as the channel member 40 but on the opposite side therefrom and integral with member 12 is the earlier mentioned stylus carrier projection 32. The stylus member 24, as seen in FIG. 8, is a plunger type mechanism wherein body member 56 is provided with an elongated slidably movable plunger rod 58 located within a cylindrical bore 60 in body 56 and carries a reduced end portion 62 projecting downwardly and outwardly away therefrom. End member 62 of stylus 24 is receivable within an opening 64 in a template or pattern member 66 which is ordinarily disposed at the stylus operator's position designated SOP in FIGS. 1 and 2. The plunger 58 is retractably spring loaded by means of spring 68 and is adapted to be operably depressed by means of the thumb engaging member 70. A horizontally disposed locking pin 72 extending transversely through the body 56 is adapted to engage a circular groove 74 in plunger 58 to retain the end 62 engaged in the desired pattern hole. In this manner the stylus member is capable of retaining the set adjustment of the operator with respect to the particular hole location on the template 66 located at the stylus operator position.

The arrangement of the template 66 and the hole designations carried thereby is such that the zero or start reference is located at the lower left hand corner of the template, FIG. 2. Although each of the back plane members may be designed such that they could be inverted in position, a pair of oppositely disposed locating pins 76 operably associated with apertures in the back plane member as well as the pattern 66 enable the back planes to be automatically correctly aligned so that the zero reference for each operator is at the lower left of each back plane as viewed from the stylus operator's position.

Figure 12:
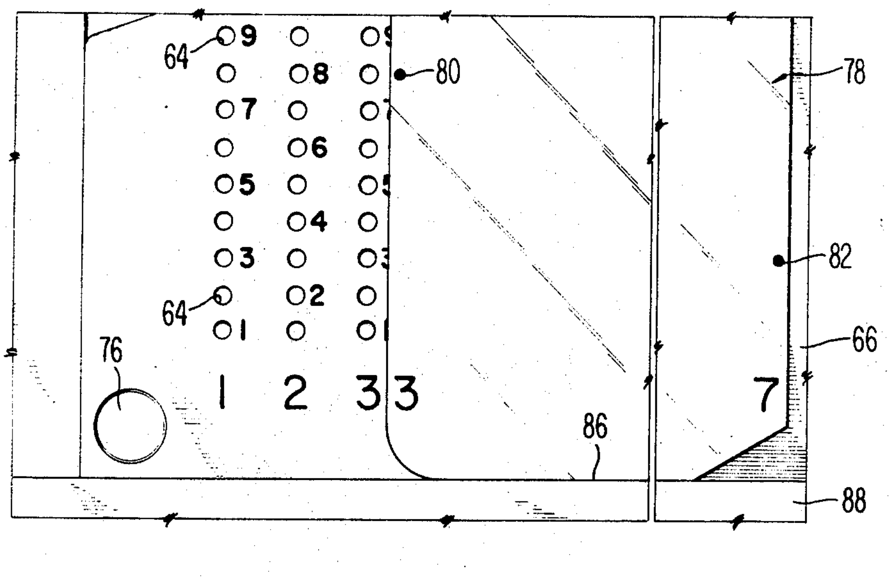
FIGS. 12 and 13 are illustrations of the use of a stylus locating card with this invention.
Figure 13:
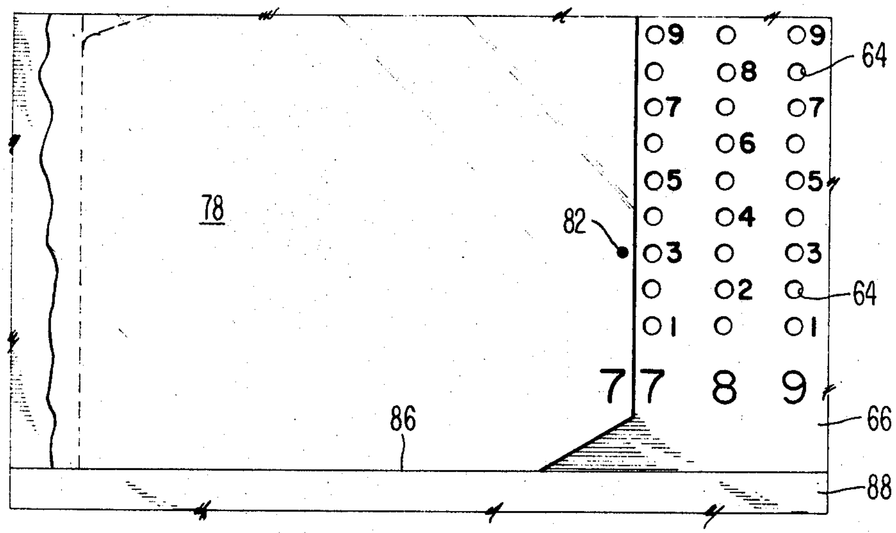
Figure 14:
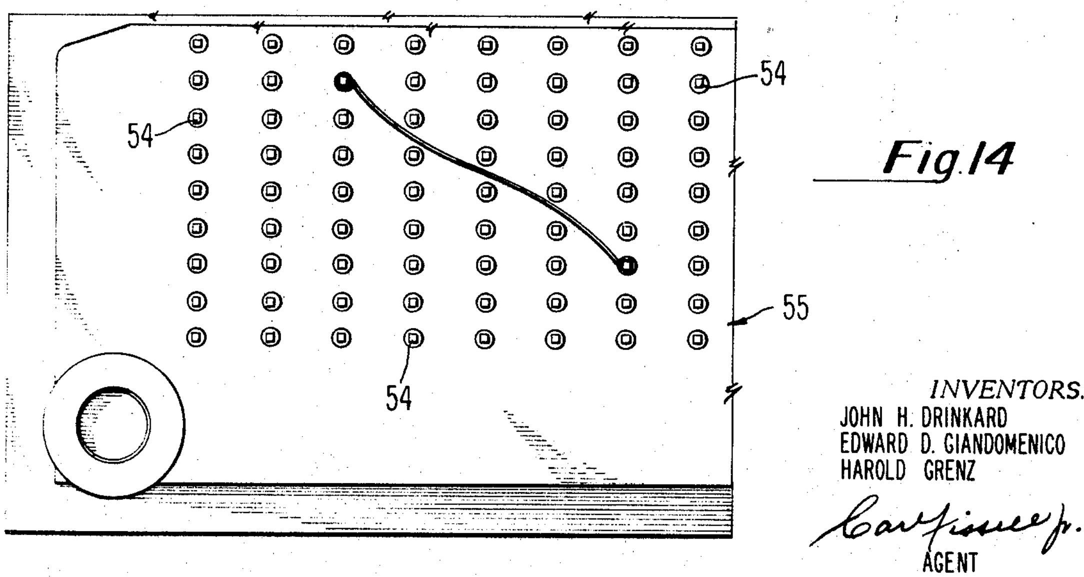
FIG. 14 is an illustration of a portion of a back plane with an electrical conductor terminated in accordance with the location designation of the card of FIGS. 12 and 13.

Template 66 which employs vertical columns and horizontal rows of holes is somewhat the same in organization as a Hollerith or IBM punch card. A stylus locating card 78, FIGS. 10, 12 and 13, similar to a punch card bearing the X and Y coordinate locations of the terminals by number is employed. This card bears on its face the origination and termination locating designations 80 and 82 as well as the length designation 84 of the particular conductor then being employed with the specific back plane being wired.

In operation, in order to wire a multicontact back plane, a stylus operator and three wire wrap gun operators are positioned at the four locations I–II–III–IV around the fixture as seen in FIG. 1. Wires of precut length are employed and cards for each length wire and each pair of terminals are pre-prepared. A wire wrap gun 50 is provided for each operator at the respective work station. Each card carries two numerical designations on the opposite left and right hand lower edge portions indicating the column number on the template within which the origination and termination locations have been predetermined. Oppositely disposed dots on the card indicate the number of the hole in the particular column of holes on the template to which the stylus is to be positioned. In the case under consideration, the two column locations are designated 4 and 7 while the hole locations indicated by the dots are 8 and 3 respectively.

In order to provide an additional safeguard to prevent any possible mislocation of the stylus relative to the terminal on any back plane as indicated by the stylus locating card, a pair of ruled scales 90 and 92 are employed at the position III. Each scale includes numerical designations corresponding to the vertical columns and horizontal rows of numbers on the template 66 and organized to be viewed by the III position operator. Thus operator III can indicate vocally to the stylus operator that the wire wrap gun for position III is located at the designated terminal location on her III position back plane corresponding to the same hole location as the stylus operator's template as called for by the stylus locating card. Any discrepancy is visually quickly and efficiently made apparent prior to the application of the actual wire wraps.

Should it be necessary or required that the wire wrapping operation be terminated for any reason, the entire planograph assembly can be locked securely in a neutral or so-called zero position, as, for example, in FIG. 2. A demountable, removable locking pin 94 is provided for this purpose and effectively immobilizes the movable portions of the apparatus with respect to the base 10.

The stylus operator at position I (SOP) places card 78, FIG. 10, bearing an origination and termination number designation (in this instance the numerals 3 and 7 are used for purposes of illustration) on the template 66 with the lower edge 86 of the card resting against the card alignment guide 88 of base 10. The operator then locates the left number designation of her card (in this case 3) so as to correspond with column hole number location 3 on the template as in FIG. 12. The stylus is then indexed to the dot designation opposite number 3 in the column, as in FIG. 12.

Simultaneously each of the target hole adaptors is perfectly and exactly, accurately located over an individual upwardly projecting contact 54 in the back plane 55 at each work station. Thereafter the work station operator introduces the desired length of previously deinsulated wire into the wire wrap gun and places the gun nozzle into the target hole 48 at the operator location. Actuation of the gun automatically wraps the desired number of turns around the particular contact designated. The stylus operator next indexes the stylus in the afore described manner to the termination location number on her template overlay card and places the stylus in the hole designated by the hole in the template, in this case column 7 hole 3, FIG. 13. Again as in the preceding illustration, the target hole adaptor at each location is automatically indexed to the exact contact in the back plane after which the wire end is wrapped around the designated terminal.

In many back plane constructions more than one wire originates and terminates with the same upstanding conductor or contact. Where two or three wraps are to be made to the same location, the wire wrap level control ears **44*a* and 44*b*** are arcuately positioned over the target hole so that the wire wrap gun nozzle will seat on the uppermost control ear to a level permitting the designated number of wraps to be made on that particular back plane conductor. This operation results in the uniform and regular spacing of wraps as seen in FIG. 10.

It should be apparent from the foregoing description that the present locating fixture not only simplifies the wire wrapping operation, but almost completely eliminates any error, human or otherwise. If the stylus operator accurately locates the stylus to the designated terminal number, the work station operator is obliged to wrap the identical terminal since the target hole adaptor obscures all the surrounding conductors but the designated conductor.

What is claimed is:

1. Wire wrap locating apparatus comprising,
template means carrying a pattern indicative of a desired position location in a matrix of rows and columns of electrical terminal locations therein,
column and row locating means operably positioned relative to said template means, stylus means movable over said template means and positionable in accordance with said locating means at a selected location on said template means, and
means carrying wire wrapping apparatus conjointly operably movable with said stylus means and positionable at a location indicated by said column and row locating means effective to permit the application of a suitable number of turns of electrically conductive wire to a desired electrical contact on a wiring panel with which said apparatus is adapted to be associated.

2. The invention in accordance with claim 1 wherein said column and row locating means comprises a disposable element bearing origination and termination designations thereon.

3. Wire wrap locating apparatus comprising,
a template including a pattern of holes indicative of a desired position location in a matrix of rows and columns of hole locations therein,
hole locating means demountably positionable relative to said template means,
stylus means movable along two axes disposed at right angles to one another over said template means and including a member positionable at an indicated hole location on said template means,
a back plane wiring panel demountably positionable with respect to said apparatus having multiple upstanding electrical contacts thereon arranged in a matrix of rows and columns,
means carrying wire wrapping apparatus conjointly operably movable with said stylus means and positionable at locations on said wiring panel indicated by said hole locating means, and
means operably associated with said wire wrapping apparatus carrying means selectively permitting said wire wrapping apparatus to apply one or more separated multiturns of wire to a selected electrical contact on said back plane wiring panel.

4. The invention in accordance with claim 3 wherein said stylus member is demountable and includes means for locking the same in a position engaging said template.

5. Wire wrap locating apparatus comprising,
a flat planar base member arranged to provide a template position and one or more wire wrapping positions,
template means located at said template positions and provided with a pattern of holes indicative of a desired position location in a matrix of rows and columns of holes,
demountable hole locating means operably associated with said template means for specifying the origination and termination locations of conductive lead wires to be employed with said apparatus,
stylus means movable in orthogonal directions over said template means and positionable at a selected location on said template means as indicated by said hole locating means,
back plane wiring panel means located at said operating stations, each said panel means including multiple electrical contacts of an effective length suitable for receiving multiple separated wire wraps arranged in a matrix of rows and columns thereon, and
means carrying wire wrapping apparatus conjointly operably movable with said stylus means and positionable at locations on said wiring panel indicated by said template effective to apply winding turns of one end of an electrical conductor to a selected electrical contact and upon subsequent movement of said stylus member to another hole location to apply winding turns of the other end of said electrical conductor to another electrical contact on said back plane wiring panel.

6. The invention in accordance with claim 3 wherein said means selectively permitting said apparatus to apply one or more turns of wire to said electrical contact comprises a pair of oppositely disposed members carried by said carrying means and selectably pivotable so as to overlie each other and said carrying means.

7. Wire wrap locating apparatus comprising, a template including a pattern of holes indicative of a desired position location in a matrix of rows and columns of hole locations therein, hole locating means demountably positionable relative to said template means, stylus means movable along two axes disposed at right angles to one another over said template means and including a member positionable at an indicated hole location on said template means, a back plane wiring panel demountably positionable with respect to said apparatus having multiple upstanding electrical contacts thereon arranged in a matrix of rows and columns, means carrying wire wrapping apparatus conjointly operably movable with said stylus means and positionable at locations on said wiring panel indicated by said template means, means operably associated with said wire wrapping apparatus carrying means selectively permitting said wire wrapping apparatus to apply one or more separated wraps of multiturn wire to a selected electrical contact on said back plane wiring panel, and means operably associated with said carrying means for adjusting the position of said carrying means with respect to an individual electrical contact effective to exactly locate the two center to center.

8. The invention in accordance with claim 7 wherein said adjusting means also includes a wire guard substantially surrounding the same effective to avoid contact between the wire wrapping device and any but the intended selected electrical contact.

9. Wire wrap locating apparatus comprising, a flat planar base member arranged to provide a template position and a plurality of wire wrapping positions, a template member located at said template position and provided with a pattern of holes indicative of a desired position location in a matrix of rows and columns of holes, a demountable hole locating member operably associated with said template means specifying the origination and termination locations and the length of conductive lead wires to be employed with said apparatus, a planograph member carrying wire wrapping apparatus movable in two orthogonal directions relative to said template member and positionable adjacent a selected location in accordance with said hole locating member, a back plane wiring panel member located at said operating stations, each said panel member including multiple electrical contacts of an effective length suitable for receiving multiple separated wire wraps arranged in a matrix of rows and columns thereon, a stylus member conjointly operably movable with said planograph member and positionable at locations on said template indicated by said hole locating member, said wire wrapping apparatus being effective when energized to apply winding turns of one end of an electrical conductor to a selected electrical contact and upon subsequent movement of said stylus member to another hole location to apply winding turns of the other end of the same electrical conductor to another electrical contact on said back plane wiring panel, and scale means for each of two axes at right angles to each other and located relative to said planograph member for visually displaying the physical location of said wire wrapping apparatus to an operator at a wire wrapping position effectively confirming the accuracy of the indicated location.

10. The invention in accordance with claim 9 wherein said planograph member includes two plate members each arranged to move along separate pairs of oppositely disposed parallel rods about two axes at right angles to one another over said base member.

References Cited

UNITED STATES PATENTS

| | | | |
|---|---|---|---|
| 3,122,826 | 3/1964 | Self | 242—7.17 |
| 3,410,317 | 11/1968 | Rondas | 29—203 X |
| 3,435,858 | 4/1969 | Taysom et al. | 140—92.1 |
| 3,451,633 | 6/1969 | Markham et al. | 242—7.09 |

THOMAS H. EAGER, Primary Examiner

U.S. Cl. X.R.

140—92.1; 242—7.09, 7.17